E. F. SCHNUCK.
COFFEE CUTTING.
APPLICATION FILED JAN. 2, 1920.

1,341,200.

Patented May 25, 1920.

INVENTOR
Edward F. Schnuck
BY
Philip S. McLean
ATTORNEY

UNITED STATES PATENT OFFICE.

EDWARD F. SCHNUCK, OF GREENBURG, NEW YORK.

COFFEE-CUTTING.

1,341,200.  Specification of Letters Patent.  Patented May 25, 1920.

Application filed January 2, 1920. Serial No. 348,867.

*To all whom it may concern:*

Be it known that I, EDWARD F. SCHNUCK, a citizen of the United States, and a resident of Greenburg, Westchester county, and State of New York, have invented certain new and useful Improvements in Coffee-Cutting, of which the following is a specification.

My present invention relates to the reduction of coffee to the granular form and the objects of the invention are to accomplish the reduction of the coffee by a "cutting" as distinguished from a grinding action and so as to produce granules substantially uniform in size and free from chaff.

To accomplish these objects I avoid so far as possible attrition of the coffee and employ a novel arrangement of cutters, chaff removers and grading devices whereby the coffee is gradually reduced to granules of the requisite size and in which the chaff, and the granules which have then been reduced to the proper fineness, are removed or separated from the balance of the product after each cutting operation.

These and other features will be clear from the following specification when taken in conjunction with the accompanying drawing wherein I have illustrated a form of apparatus for carrying out the invention.

Figure 1:
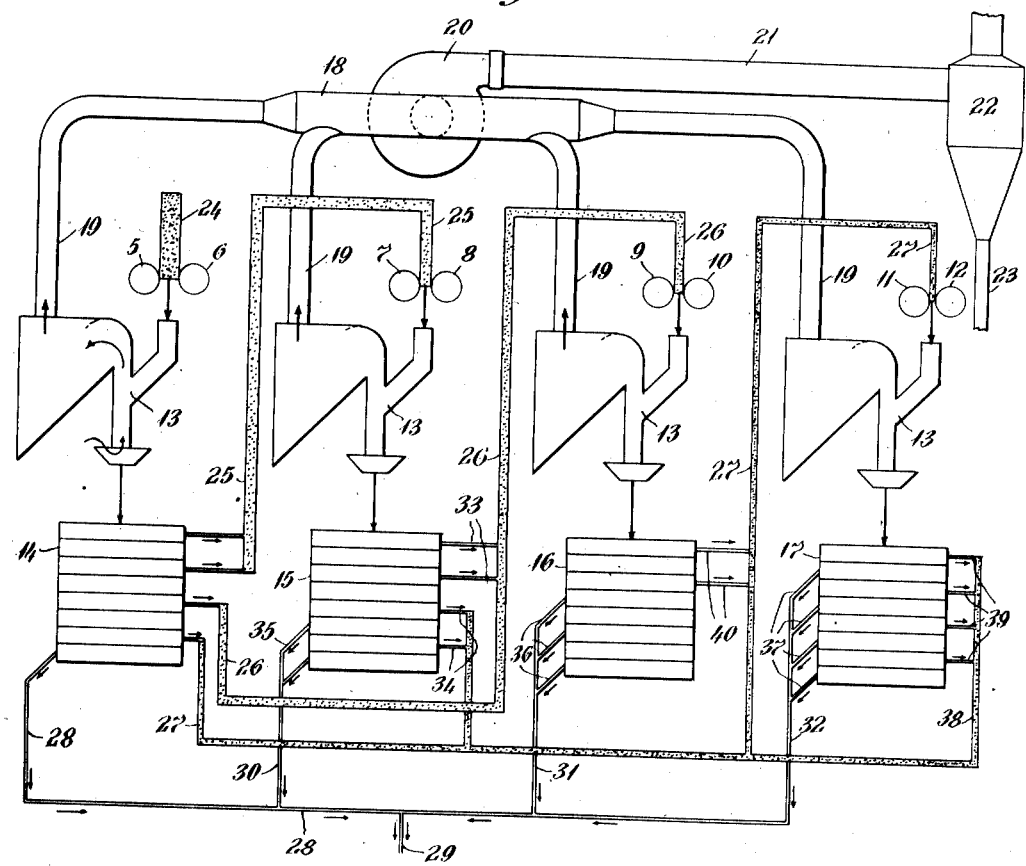
Figure 2:
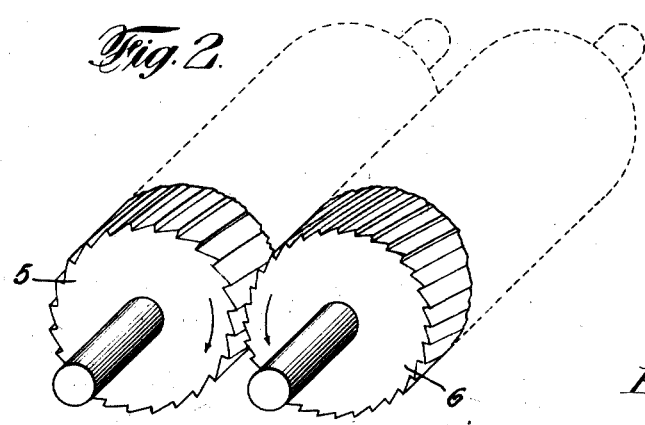

In this drawing Figure 1 is a more or less diagrammatic view of the apparatus and Fig. 2 is a detail view of one pair of cutting rolls.

The apparatus illustrated embodies four pairs of cutters shown as rolls and designated 5—6, 7—8, 9—10 and 11—12, of progressively finer gage, the first pair being designed to operate on the whole bean and to accomplish a preliminary reduction thereof and the succeeding pairs being designed each to further reduce the product, the last pair of rolls being designed to complete the reduction.

The cutter rolls employed preferably are of the spiral tooth type, illustrated in Fig. 2, and they are preferably operated at differential speeds and are differentially toothed as well, so as to operate as "cutters." As an example, in an installation such as illustrated the rolls of the first pair may be toothed three and six to the inch respectively and the first roll be operated at thrice the speed of the second roll, or say six hundred revolutions per minute to say, two hundred revolutions per minute of the second roll. Roll 7 of the second pair of cutters may have seven teeth to the inch and roll 8 ten teeth to the inch. This gradual increase in the number of teeth may be carried out in the third pair of rolls, where for instance, the first roll 9 may be made with twelve teeth to the inch and the second roll 10 with fourteen teeth to the inch. Similarly, in the fourth pair, roll 11 may be made with sixteen teeth to the inch and roll 12 with eighteen teeth to the inch. This particular arrangement is given simply as a practical and preferred example of how the reduction may be made in a gradual and effective manner and it will be understood, of course, that the proportions and relations may be varied to meet different conditions and requirements.

Associated with each of the several cutters is a chaff remover 13 of suitable design and disposed so as to operate on the cut product practically immediately after it passes between the cutters and before the product is graded. This results in the removal of the chaff practically as soon as it is freed from the bean and prevents the flakes of chaff from mingling with and being broken up and carried off by the cut product.

After being freed of chaff, the product from each set of cutters is, in the illustration, graded according to size by the screening devices 14, 15, 16 and 17 associated with the respective cutters and each consisting in the present disclosure of a four unit screen.

Provision is also made in the present illustration for collecting the powdered or pulverized coffee which may be carried off with the chaff, the apparatus for such purpose being disclosed as a trunking system 18 having branches 19 connected with the several chaff removers, said system being provided with a suction blower 20 which discharges the air through an exhaust conduit 21 to a collector 22 from which the pulverized coffee is discharged at 23. The chaff may be discharged directly from the several chaff removers.

In the drawing I have endeavored to illustrate the flow and gradual reduction of the coffee by lines graduated in width to represent the different grades of product. Thus the relatively heavy or coarse line 24 at the left in Fig. 1 illustrates the supplying of the coffee in the whole bean to the first set of cutters. After removal of the chaff, the product of the first cutters is graded and the heavier or coarser portion thereof, say for instance, that flowing over the first two screens is taken off and passed to the second set of cutters, as indicated by the flow line 25. A second finer grade of product resulting from the first cutters is indicated at 26 as taken from, say the third screen of the grading device and passed over to the third set of cutters. A third finer grade of product of the first cutters is indicated at 27 as taken off from the fourth screen of the first grading device and passed over to the fourth or final set of cutters.

In the passage of the coffee beans through the first set of cutters, even though said cutters may be relatively coarse, some parts of the beans will naturally be reduced to granules of the size desired. My invention contemplates the removal of these granules of the requisite fineness as soon as they are separated from the remainder of the product. Thus I have indicated by the line 28 how these finer granules are separated out and carried off to a packing or storing station as at 29. This removal of the granules of the requisite fineness is a part of each cutting operation, the flow of granules of the requisite size produced by the second cutter being indicated at 30, from the third cutter at 31 and from the fourth or final cutters at 32.

From this it will be clear that as soon as any part of the coffee is reduced to the desired fineness, it is separated out from the remainder of the product. This leaves the subsequently operating cutters free to work only on that part of the product which needs to be further reduced and prevents the smaller or "finished" granules from being carried through the cutters again and further reduced.

The "oversize" product produced by the second set of cutters is graded, for instance, as indicated in the illustration by taking off the overflow from, say, the first two screens at 33 and passing the same on with the flow 26 to the third cutter and by taking off that part which flows over the last two screens as indicated at 34 and passing it off with the flow 27 to the final cutters. The second cutters may produce twice the amount of finished granules produced by the first cutter and the screens may accordingly be graded and connections made for carrying off finished granules from two of the lower screens, as indicated at 35, instead of from only the last screen, as illustrated at the first cutter.

In similar fashion, a higher percentage of finished granules may be produced at the third cutter, where I have illustrated the finished material being taken off from three of the screens, at 36. At the last, or final cutter, the finished material may be taken off from all four of the screens, as indicated at 37.

Any oversize material at the last set of cutters will be sent back to be recut and all of such material will probably be fine enough to be combined with the flow 27 which goes to the final cutters. This return material is indicated by the flow line 38 and the same is shown as being taken off from all four of the screens, at 39.

Any oversize material produced by the third set of cutters also will probably be fine enough to be sent direct to the final set of cutters, the flow lines 40 indicating such oversize material as being taken off the two upper screens and sent on with the flow 27 to the final cutters.

In my invention it will be seen that the chaff is, in each instance, removed as soon as it is freed from the bean or cut product and is not permitted to mingle with the product thereafter. This means that the final product is practically free from chaff. Also, by the gradual reduction of the coffee by means of separate cutters graded to handle the grade of product which is supplied to them, said cutters can be operated with the greatest efficiency and so as to accomplish a true cutting, as distinguished from a grinding action. Also, by grading and routing the different grades to the cutters designed to handle the same, overloading or underloading of any of the cutters is avoided and a natural gradual reduction is accomplished. This distribution of the load or work between the different sets of cutters also saves the cutters and equalizes the power required for the different machines. As the reduction proceeds, a greater amount of finished material will be produced by successive cutters and this factor is taken care of by arranging the screens and conduit systems at the successive cutters to take care of the increased production.

In the distribution of the load between the several machines, it will be apparent that while the full stream passes between the first set of cutters, said cutters are designed simply to handle the preliminary or rougher part of the work which, in effect, is compensated for in the successive sets of cutters by reason of the fact that said successive cutters operate more intensively to bring the product down to the granules of the desired fineness. The final product is a high-grade cut coffee of substantially uniform size clean-cut granules and practically free of chaff.

What I claim is:

1. The process of cutting coffee which comprises passing the coffee beans between cutters, removing from the product of such cut the chaff freed by such cutting, separating from the cut and cleaned product the granules which have been reduced by such cutting to the required fineness and passing the remainder of the cut product freed of the chaff between finer cutters and removing the chaff and separating out the granules of the requisite fineness after each cutting.

2. The process of cutting coffee which comprises passing the coffee beans between cutters, removing from the cut product the chaff freed by such cutting, separating from the cut and cleaned product the granules which have been reduced by such cutting to the required fineness, grading the remainder of the cut product, passing the different grades of such remaining cut and chaff-cleaned product to cutters gaged to operate on such respective grades and removing the chaff and separating out the granules of requisite fineness after each cutting operation.

3. The process of cutting coffee by means of a series of cutters of progressively finer gage which comprises passing the coffee beans to the coarsest grade cutters, removing the chaff and separating out the grains of requisite fineness resulting from this cutting and then grading the remainder of such cutting from which the chaff has been removed and passing it according to grade to the successively finer cutters, removing the chaff and separating out the granules of requisite fineness resulting from each cutting.

4. The process of cutting coffee by means of cutters graded to reduce to different degrees of fineness which comprises passing the coffee beans to the cutters of coarser grade, removing the chaff and separating out the granules of requisite fineness resulting from such cutting, grading the remainder of the cutting and passing the same according to grade to the cutters at different fineness, removing the chaff and separating out the granules of requisite fineness produced by each of the subsequent cutters and separating out and collecting the pulverized coffee from the chaff of all of the several cutters.

5. In coffee cutting apparatus, a series of cutters graded to reduce coffee to different degrees of fineness, a chaff remover associated with each cutter and operating on the entire product of such cutter, means at each cutter for grading the cut product according to size, means for selectively transferring the graded product to the cutters designed for the respective grades and means at each of the cutters for directly separating out the granules of requisite fineness immediately after the chaff has been removed therefrom.

6. The process of cutting coffee which comprises passing the coffee beans between cutters, removing the chaff freed from the coffee beans by such cutting, grading the cut product and passing it according to grade to progressively finer cutters, chaff cleaning and grading the cut product of said latter cutters and withdrawing progressively greater amounts of the fine-cut product from said cutters.

7. The process of cutting coffee by means of progressively graded cutters which includes chaff cleaning and grading the cut product produced by the respective cutters and routing the different chaff cleaned grades to said cutters so as to substantially balance the load on the several cutters.

8. The process of cutting coffee which includes first removing the chaff and then passing the oversize product produced by different cutters to cutters of successively finer gage and removing chaff and separating out at each cutter the granules which have been reduced by such cutters to a predetermined fineness, removing from the successive cutters progressively greater amounts of the fine-cut product.

In witness whereof, I hereunto set my hand this 31st day of December, 1919.

EDWARD F. SCHNUCK.